US007603365B2

(12) United States Patent
Chen et al.

(10) Patent No.: US 7,603,365 B2
(45) Date of Patent: Oct. 13, 2009

(54) SYSTEM AND METHOD FOR CAPTURE AND PROCESSING OF OVERFLOW CHARACTERS FROM USER INPUT

(75) Inventors: Yen-Fu Chen, Austin, TX (US); John H. Bosma, Cedar Park, TX (US); John W. Dunsmoir, Round Rock, TX (US); Venkatesan Ramamoorthy, Round Rock, TX (US); Mei Yang Selvage, Pocatello, ID (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 11/337,849

(22) Filed: Jan. 23, 2006

(65) Prior Publication Data

US 2007/0088705 A1      Apr. 19, 2007

Related U.S. Application Data

(63) Continuation-in-part of application No. 11/249,938, filed on Oct. 13, 2005, now Pat. No. 7,433,877.

(51) Int. Cl.
*G06F 17/00* (2006.01)
(52) U.S. Cl. ............................ 707/100; 707/6; 707/200; 714/781
(58) Field of Classification Search ................... 707/10, 707/100, 6, 200; 709/217; 714/781
See application file for complete search history.

(56) References Cited

U.S. PATENT DOCUMENTS

| | | | |
|---|---|---|---|
| 4,962,498 A | | 10/1990 | May, Jr. |
| 5,406,281 A | * | 4/1995 | Klayman ..................... 341/51 |
| 6,199,078 B1 | | 3/2001 | Brittan et al. |
| 6,519,737 B1 | | 2/2003 | Derby |
| 6,571,013 B1 | * | 5/2003 | Macey et al. ................. 382/181 |
| 6,882,642 B1 | | 4/2005 | Kejriwal et al. |
| 7,266,550 B2 | | 9/2007 | Dumitru et al. |

(Continued)

OTHER PUBLICATIONS

GNC C Library Manual, sections "introduction" pp. 1-10, "string and array utilities" pp. 1-14, Apr. 9, 1993, Sandra Loosemore, Roland McGrath, Andrew Oram, Richard Stallman.*

(Continued)

*Primary Examiner*—Mohammad Ali
*Assistant Examiner*—Donald Lawson
(74) *Attorney, Agent, or Firm*—Robert H. Frantz; David A. Mims, Jr.; William S. Steinberg (57) ABSTRACT

A system and method for preventing user-input text strings of illegal lengths from being submitted to a database where, for each character in the string, a character length is determined in quantities of digital units of storage according to an encoding schema, the character lengths are accumulated into a total string length, also measured in digital units of storage, and the total string length is compared to one or more database input field requirements such as non-null and maximum length specifications. If a limit is not met, the system and method are suitably disposed in a manner to block or prevent submission of the user-input string to the database. Overflow sub-strings are extracted and stored from input strings which exceed the input length limit, and are further processed to yield additional storage and resource allocation.

12 Claims, 10 Drawing Sheets

U.S. PATENT DOCUMENTS

| | | | |
|---|---|---|---|
| 2003/0120992 | A1 | 6/2003 | Glaise |
| 2004/0133897 | A1 | 7/2004 | Covely, III |
| 2005/0050068 | A1* | 3/2005 | Vaschillo et al. ............ 707/100 |
| 2005/0055554 | A1* | 3/2005 | Sion et al. .................. 713/176 |
| 2005/0065811 | A1 | 3/2005 | Chu et al. |
| 2005/0097187 | A1* | 5/2005 | Thompson et al. .......... 709/217 |
| 2005/0111420 | A1 | 5/2005 | Fujii |
| 2005/0246159 | A1* | 11/2005 | Perla et al. ..................... 704/8 |
| 2005/0256839 | A1* | 11/2005 | Leong et al. ................... 707/1 |
| 2006/0075116 | A1* | 4/2006 | Chitilian et al. ............ 709/227 |
| 2006/0116912 | A1* | 6/2006 | Maes ............................. 705/4 |
| 2006/0212846 | A1* | 9/2006 | O'Farrell et al. ............ 717/116 |
| 2006/0236224 | A1* | 10/2006 | Kuznetsov et al. .......... 715/513 |
| 2007/0022425 | A1* | 1/2007 | Jackson ...................... 718/104 |
| 2007/0067483 | A1* | 3/2007 | Fallon ......................... 709/231 |
| 2007/0136676 | A1* | 6/2007 | Kruempelmann et al. ... 715/764 |
| 2007/0174144 | A1* | 7/2007 | Borders et al. ................ 705/27 |
| 2007/0239514 | A1 | 10/2007 | Lissy et al. |
| 2007/0242809 | A1* | 10/2007 | Mousseau et al. ........ 379/88.18 |
| 2007/0244890 | A1* | 10/2007 | Dunning et al. ................ 707/6 |

OTHER PUBLICATIONS

Leob Mitchell, Tharp Alan, Tridirectional Computed Chaining an Efficient Hashing Algorithm for Limited Space Applications, IEEE, (COMPSAC'05).*

Markoff John, IBM to Announce Expansion of data Density Storage Limit, The New York Times, May 21, 2003, Google.*

Chirkova Rada, Halevy Alon, Suciu Dan, A formal perspective on the view selection problem, Sep. 25, 2002, ACM.*

IBM, United States Software Announcement 205-18, IBM Cloudscape V10.1 Provides a Full-featured, Robust, Small Footprint Database Server that is Simple to Deploy and Reduces the Cost of Embedded and Web-based Applications, http://www-306.ibm.com/common/ssi/fcgi-bin/ssialias?infotype=an&su. on Sep. 15, 2005.

Jakarta Commons Home "Welcome to the Jakarta Commons", downloaded from http://jakarata.apache.org/commons/index.html on Sep. 15, 2005.

Designing Enterprise Applications with the J@ee [TM] Platform, Second Edition, "4.4 Web-Tier Application Framework Design," downloaded from http://java.sun.com/blueprints/guidelines/designing_enterprises_application on Sep. 15, 2005.

The Apache Software Four Struts, downloaded from http://www.apache.struts.org on Sep. 15, 2005.

Kuhn, Markus, "UTF-8 and Unicode FAQ for Unix/Linux", downloaded from http://www.cl.cam.ac.uk~mgk25/unicode.html on Sep. 15, 2005.

Wagner, Jim, "WebSphere Gets Java Makeover", downloaded from http://www.internetnews.com/dev-news/print.php/3349281 on Sep. 15, 2005.

Raman, Rajeev, et al. "Engineering succinct DOM", Mar. 2008, ACM, EDBT '08.

Kirkegaard, C., et al. "Static analysis of XML transformations in Java", Mar. 2004, IEEE JNL, vol. 30, Issue 3, pp. 181-192.

Loosemore, Sandra, et al., "The GNU C Library—Extended Characters", retrieved on Oct. 7, 2008 from http://www.cs.utah.edu/dept/old/texinfo/glibc-manual-0.02/library_6.htm.

Balaban, Bob, "Multi-Language Character Sets", retrieved on Oct. 7, 2008 from: http://www.lotusgeek.com/sapphireoak/lotusgeekblog.nst/DOWNLOADS/2BCEBB5206735AA28525711D006DB392/$FILE/Multi_Lang_Char_Sets.pdf.

* cited by examiner

```
<script language="JavaScript">
var names = new Array(); // array of the names of the elements that need to be controlled for UTF-8 length
var maxBytes = new Array(); // the maximum bytes allowed in each controlled element
var oldValues = new Array(); // the initial value in those elements, used to reset the value if length is
                             // exceeded
var formsArrayLength = 0;    // the number of forms in the HTML page
var elementsArrayLength = 0; // the number of elements in each form
var x = 0;             // outer loop counter
var y = 0;             // inner loop counter
var visibleName = "";  // name in the HTML tag
var hiddenName = "";   // name in the hidden tag
var frontName = "";    // first 8 charaters in the hidden tag -should be "utf8size"
var backName = "";     // remainder of the hidden name - should be equal to the visibleName of the
                       // preceding tag
var maxLength = 0;     // temporary field which is equal to the value in the hidden tag
var len = 0;           // temporary value giving the current array position
var firsttime = 0;     // boolean flag used to make sure the focusit() is executed only once
var name = "";         // used in blurit() for name of input tag
var temp = "";         // used in blurit() for value of input tag // the function focusit() is only executed once whenever the first text field gets the focus. It reads through the
// forms array and finds which text boxes are to be controlled for UTF-8 length. It creates arrays of thoes names,
// maximum number of bytes, and the initial values of those text boxes.
function focusit() {
    if(firsttime == 0) {
        firsttime = 1;
        formsArrayLength = window.document.forms.length;

for(x = 0; x < formsArrayLength; x++) {
            elementsArrayLength = window.document.forms[x].elements.length;

for(y = 0; y < elementsArrayLength; y++) {
                hiddenName = window.document.forms[x].elements[y].name;
```

Fig. 4a

```
if(hiddenName.length > 8) {
    backName = hiddenName.substr(8, hiddenName.length - 8);
    frontName = hiddenName.substr(0, 8);
} if(frontName == "utf8size") {
    maxLength = window.document.forms[x].elements[y].value;
} if(y > 0 && maxLength > 0) {
    visibleName = window.document.forms[x].elements[y - 1].name;

if(visibleName == backName) {
        len = names.length;
        names[len] = backName;
        maxBytes[len] = maxLength;
        oldValues[len] = window.document.forms[x].elements[y - 1].value;
    }
}

// The function blurit() is called when an input text field loses focus.  If the value has changed, the UTF-8 length
// is calculated.  If the maximum length is exceede an alert is displayed and the field is reset.
function blurit(obj) {
    name = obj.name;
    for(x = 0; x < names.length; x++) {
        if(name == names[x]) {
            break;
        }
    }
    if(x < names.length) {
        temp = obj.value;
        if(temp != oldValues[x]) {
            len = utf8length(temp);
            if(len > maxBytes[x]) {
                obj.value = oldValues[x];
                alert("Max length exceeded. You tried to enter data that requires " + len + " bytes.\nOnly " +
                    maxBytes[x] + " bytes are allowed");
            }
        }
    }
}
```

Fig. 4b

```
// Calculate the length in bytes of the UTF-8 encoded data
function utf8length(str) {
    var total = 0;
    var n = str.length;
    if(!(n > 0)) {
        return 0;
    }
    for(var x = 0; x < n; x++) {
        unc = str.charCodeAt(x);
        if(unc == 0) {
            total = total + 2;
        }
        else if(unc < 128) {
            total = total + 1;
        }
        else if(unc < 4096) {
            total = total + 2;
        }
        else {
            total = total + 3;
        }
    }
    return total;
}
</script>
```

42 (overall), 43, 44, 45, 46, 47

SYSTEM AND METHOD FOR CAPTURE AND PROCESSING OF OVERFLOW CHARACTERS FROM USER INPUT

CROSS-REFERENCE TO RELATED APPLICATIONS

CLAIMING BENEFIT UNDER 35 U.S.C. 120

This patent application is a continuation-in-part of U.S. patent application Ser. No. 11/249,938, now U.S. Pat. No. 7,433,877, filed on Oct. 13, 2005, by Yen-Fu Chen, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent application Ser. No. 11/249,938, now U.S. Pat. No. 7,433,877, filed on Oct. 13, 2005, by Yen-Fu Chen, et al., is hereby incorporated by reference in its entirety, including figures.

BACKGROUND OF THE INVENTION

1. Field of the Invention

This patent application is a continuation-in-part of U.S. patent application Ser. No. 11/249,938, now U.S. Pat. No. 7,433,877, filed on Oct. 13, 2005, by Yen-Fu Chen, et al. This invention relates to the fields of data control, and especially to fields of determining and checking input data characteristics to databases.

2. Background of the Invention

Figure 3:
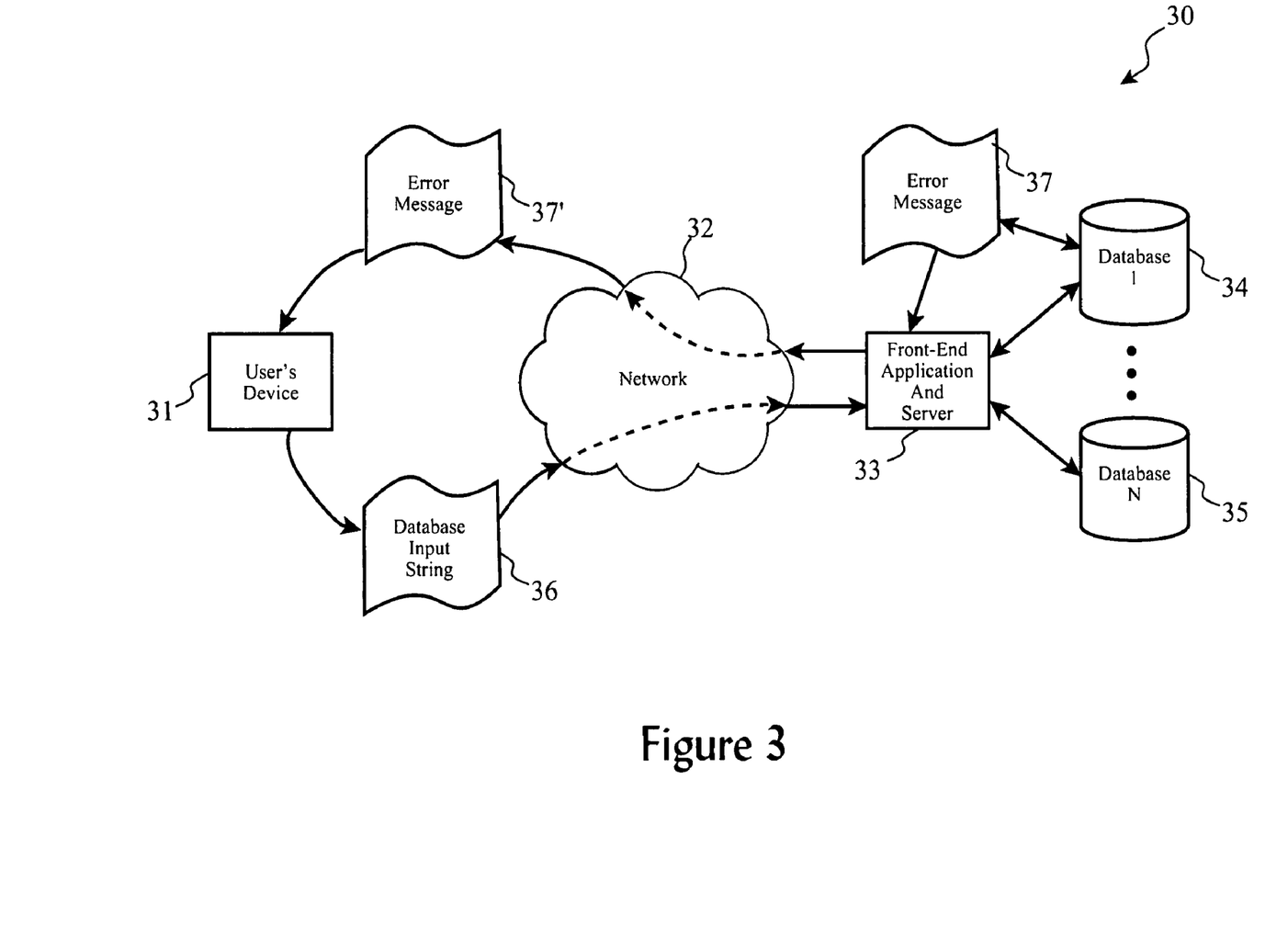
FIG. 3 illustrates a typical arrangement of databases, front-end application(s), and a user's device for entering data into the databases.

Various types of databases such as hierarchical, relational and object-oriented databases, offer consistent data storage, and provide transaction persistence, security, concurrency and performance. Consequently, a distributed architecture (30) that uses databases (34-35) as the back-end storage mechanisms and applications (33) for programming logic have become prevalent, as shown in FIG. 3. Many of these database arrangements may be accessed over a network (32) by users of devices (31) such as web browsers, wherein users can retrieve and enter information to the databases via the application program.

Most databases have a maximum input string length requirement which is often specified in characters. Most database designs, however, actually implement their maximum string length in bits, bytes or words. In such a computing environment, a front-end application (33) normally checks the length in characters of user input strings prior to submitting the queries to the back-end database (34, 35) so that it can prevent users from entering strings (36) that are longer than what database allows.

If the input strings are longer than database allowable length, an error message (37) is typically generated from database, will is often returned (37') to the end user. However, this is an undesirable result because database error message may reveal table and column names, which is not only unprofessional in appearance to the user, it may violate one or more security guidelines. Moreover, the error message may not be user friendly.

In today's world, multi-language operating environments have increasingly become the norm of everyday business, and the application programs those enterprises use are required to handle multi-language input strings. It is not a troublesome issue in an purely English environment, such as a system using exclusively the American Standard Code for Information Interchange ("ASCII"), to check user input string length corresponding to database allowable fields since each character in ASCII encoding schema uses only one byte, and it isn't a big issue in other fixed byte-length native language encoding schema. In such a case, if a database specifies a maximum input string length of 128 characters in ASCII, one can assume that the database can handle input strings of length 128 bytes.

In another example, consider a database application which is operating in a Chinese-only environment which is utilizing GB5 encoding. GB5 stores every Chinese character in two bytes. To check input string length, the front-end application program can predict exactly how many characters are allowed corresponding to database fields by dividing allowable text entries in half (e.g. two bytes per character).

However, as different languages are used simultaneously within the same database, this can be much more problematic to address. For example, a common multi-language encoding schema is UTF-8. UTF-8 encoded strings can store characters using between one byte and three bytes per character, depending on the language from which the character or symbol is taken. For instance, a Chinese character in UTF-8 requires three bytes for encoding, while an Arabic character consumes only two bytes, a Hebrew character takes two bytes, a French character takes one or two bytes, an English character takes one byte, and special characters like currency symbols can take two bytes.

Many of today's front-end database applications are hard-coded to validate text entry length against database allowable length. Moreover, these applications are also often hard coded with logic to check whether text entry fields have at least one character to fulfill database requirement for not-nullable fields. Examples of validations done in code are shown in Table 1, using Sun Microsystem's Java™ code, and Table 2 using Java Script™.

TABLE 1

Example Java Code to Validate Database Input String Length

```
if (ss.strPoNumber.length( ) < 1) {
    throw new AsErrorException(getMessage("50001"));
}
```

TABLE 2

Example Java Script to Validate Database Input String Length

```
// Use Maximum attribute in the text entry field in web pages.
//Maxlimit is a hard-coded value in the html page.
if(field.value.length > maxlimit) {
        field.value = field.value.substring(0, maxlimit);
    } else {
        countfield.value = maxlimit – field.value.length;
}
```

The length( ) function in the example of Table 1 checks whether the user's text entry has at least one character, and the maxlimit in the example of Table 2 requires a declaration of variable for allowable character length within the code scope. These are fundamentally flawed processes for checking input string length, especially in multi-lingual applications, for two reasons.

First, the maxlimit variable and the maximum attribute only counts the number of characters, not the number of bytes. In a multi-language environment, checking character length may produce wrong results because characters in UTF-8 can be one to three bytes in length, and the front-end applications cannot accurately predict whether a text string reaches the allowable database length.

For example, if there is a text entry field in a front-end application that uses a 10 byte database field, and a user enters a text string such as "I like IBM very much" in Chinese:

我特别喜欢IBM

Today's applications would calculate the total number of characters of this entry as 9, but this string actually uses 18 bytes (5*3+3) when encoded in UTF-8. The application will consider the text entry is less than the maximum length in database, so it will submit the entry to the database, the database will detect the error, and will throw back an error message that the length is too long. At this point, the user will not be able to know how many characters to remove in order to fit into the database field.

Second, even if the front-end applications check the data length in bytes, it is tedious to change hard-coded variables when requirements or design desire changes in database field length or from null to not-null attribute. Such simple changes require considerable of code re-work on front-end applications, increasing the project risk and slowing down the development pace.

Therefore, a method and mechanism is needed in the art to calculate text string lengths in bytes for multi-lingual text encoding schemes. Further, there is a need in the art in some circumstances to centralize input string length checking logic for applications, in order to enable rapid changes in text entry length and enforce the not-null attribute. In other circumstances, there is a need in the art to distribute input string length checking in order to efficiently leverage distributed and locally cached database storage efficiencies.

SUMMARY OF THE INVENTION

The present invention provides system and method for preventing user-input text strings of illegal lengths from being submitted to a database where, for each character in the string, a character length is determined in quantities of digital units of storage according to an encoding schema, the character lengths are accumulated into a total string length, also measured in digital units of storage, and the total string length is compared to one or more database input field requirements such as non-null and maximum length specifications. If a limit is not met, the system and method are suitable disposed in a manner to block or prevent submission of the user-input string to the database. The invention can alternatively be realized as a plug-in for database front-end application programs, as a stand-alone web services provider, or as a plug-in for a client-side database access program such as a web browser.

BRIEF DESCRIPTION OF THE DRAWINGS

The following detailed description when taken in conjunction with the figures presented herein provide a complete disclosure of the invention.

FIGS. 4a-4c provide example script code according to one embodiment of the present invention.

DESCRIPTION OF THE INVENTION

Figure 5A:
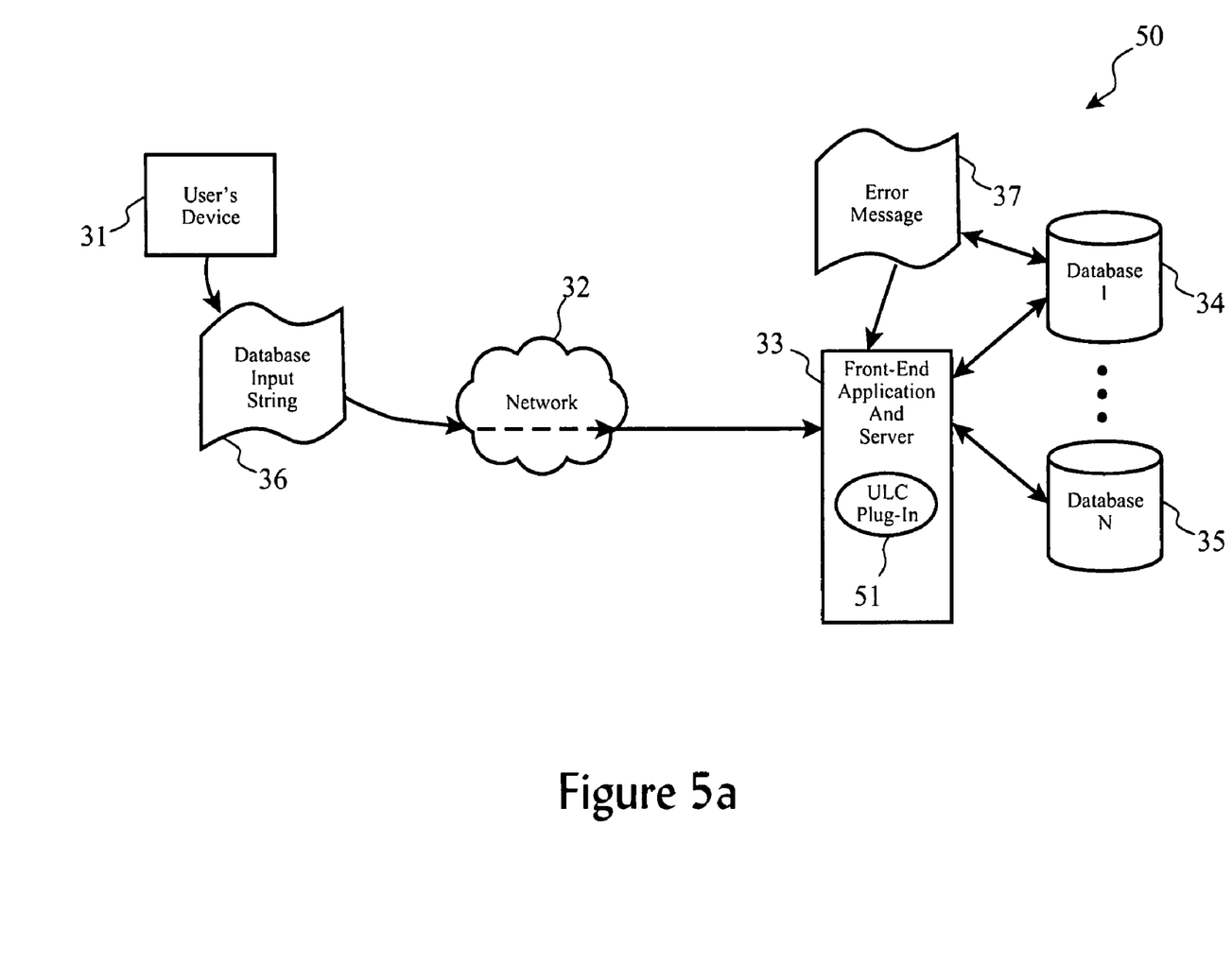
FIGS. 5a-5c depict several embodiments of the present invention, including client-side, web services-based, and server-side implementations.

According to one embodiment of the present invention, a stand-alone Unicode Length Checker ("ULC") plug-in (51) is provided to a front-end application to determine the number of bytes in a user's text entry (36), and to verify the string length and null attribute conformation in the memory, as shown (50) in FIG. 5a. The text strings are preferably only submitted to database server after the length confirms with the allowable database field length.

Figure 5B:
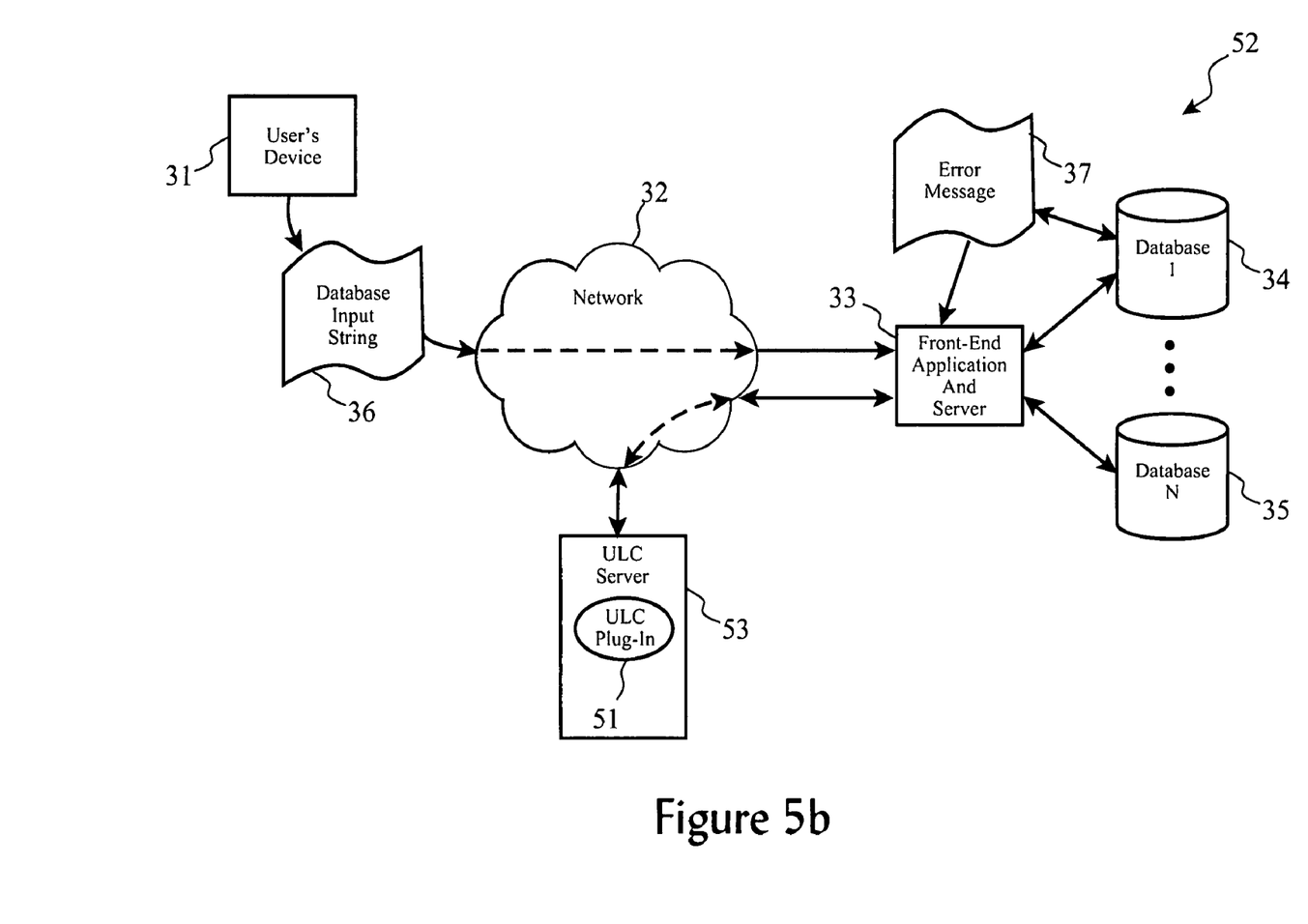

In another embodiment of the present invention, the various functions of the ULC plug-in (51) are provided as Web services by a web server (53), which enables asset reuse for any applications (33), either using a database or content management system as a back-end system, as shown (52) in FIG. 5b. In this embodiment, front-end application programs subscribing to the ULC plug-in's length-checking services can reside on anywhere on network (32), on any platform, and using any programming languages.

In yet another embodiment, the ULC plug-in (51) is provided as a stand-alone product, or Integrated Development Environment ("IDE"), database or content management middleware vendors can bundle the ULC plug-in and ship it with their products to ease the application development.

Some advantages realized by the present invention over the existing length-checking methods are:

(a) The length-checking logic is de-coupled from the hard-coded application as a stand-alone plug-in, which further facilitates the de-coupling of applications and physical database models.

(b) Use of the ULC plug-in accelerates development of new applications, and minimizes the impact of database length changes to the application logic. Since the verification is performed against the live database or a metadata cache, a change to a database length does not require the programmers modify the hard-coded value or configuration file. Thus, it reduces unnecessary effort to keep presentation layer and database layer in synch and relieve programmers from tedious work on coding and maintaining the length check logic.

(c) The invention enables asset reuse based on length-checking patterns. The ULC plug-in can be used with any application regardless of its location, platform or programming language. Asset reuse rate increases greatly when these functions are offered as Web services via Service-Oriented Architecture ("SOA").

(d) The ULC plug-in can work with any national language strings that use any encoding schemas (e.g. for fixed-byte or variable-byte encoding schemas). It is particularly useful when used with UTF-8 or other variable-byte encoding schemas.

(e) The ULC plug-in eases change management. A change in database doesn't require change in the application; a change in text entry length does not always require a database change.

Figure 4B:
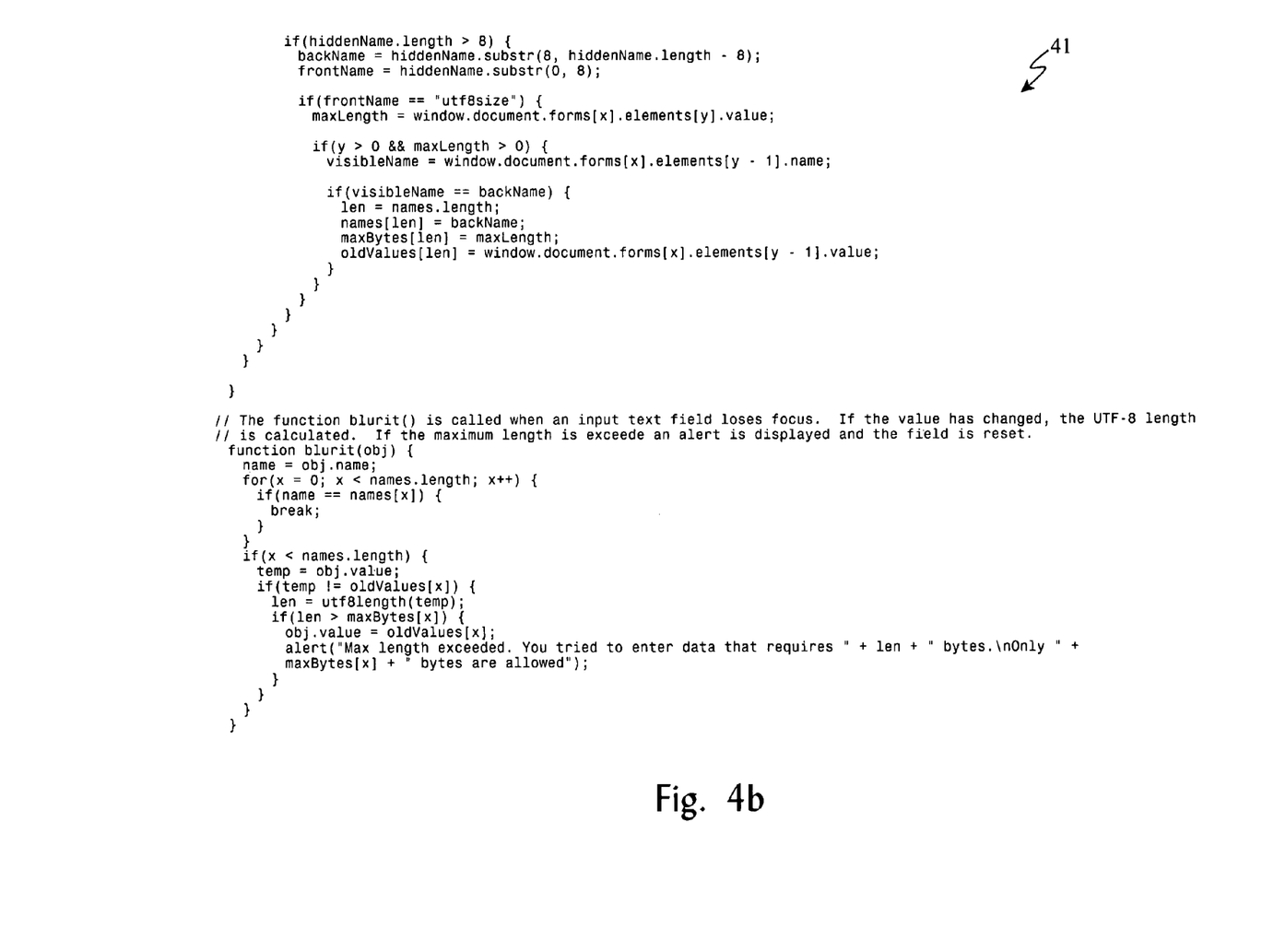
Figure 4C:
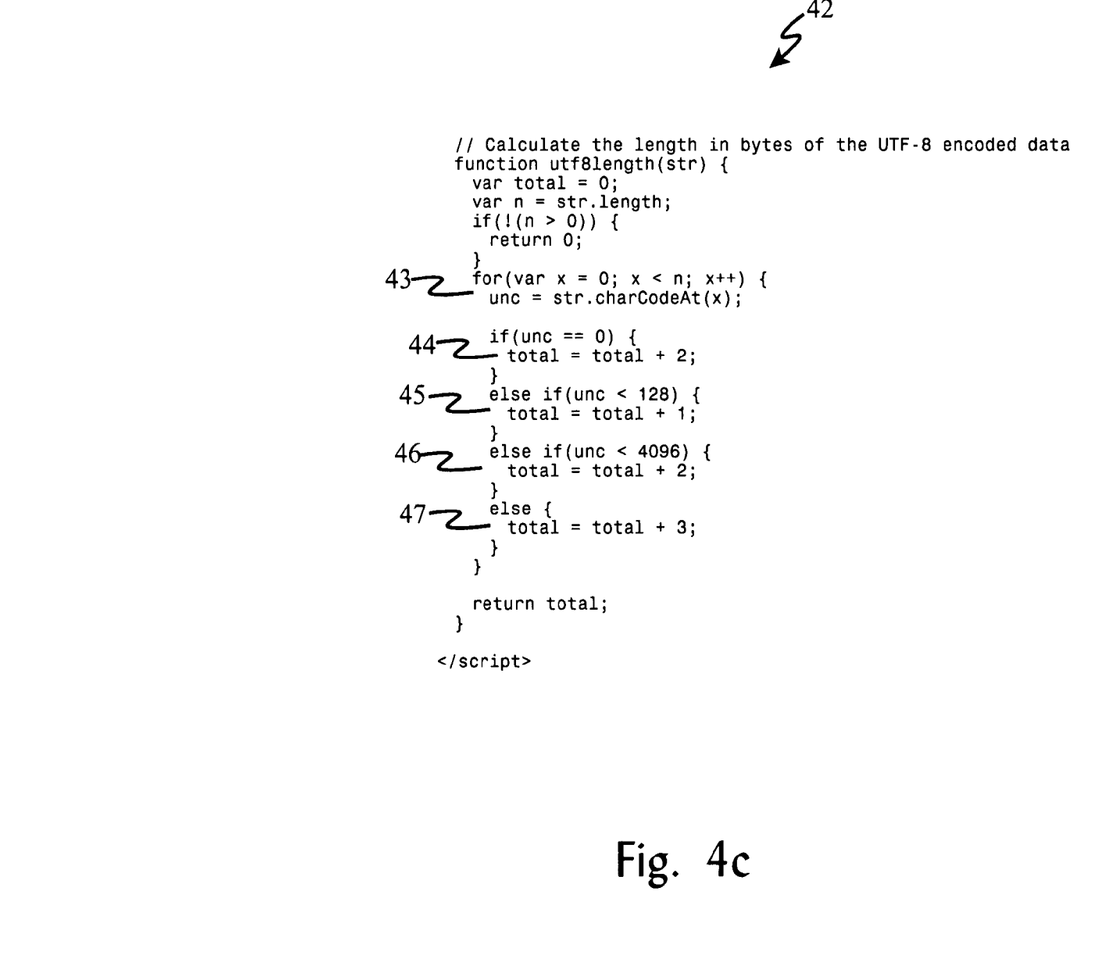

FIGS. 4a-4c disclose one embodiment of the invention in the form of an "industrial strength" JavaScript program, including explanatory comments within the example code. In order to employ this script, a web page designer may simply add the script code into the <head>section of the Hyper Text Markup Language ("HTML") page. For example, actual HTML to invoke the invention for an <input>tag is shown in Table 3.

TABLE 3

Example HTML Code to Invoke the ULC Plug-in

<input type="text" name="text1" ............ onFocus="focusit( )" onblur="blurit(this)" />
<input type="hidden" name="utf8sizetext1" value="50" />

In this example, the use of the "hidden" tag is to pass the value of 50, in this case, which gives the maximum number of bytes. These two lines of code can either be written or done automatically by custom struts or Java Server Faces, both of which are programming methodologies which are well known in the art. Preferably, the input values are read from the database using initialization ("init") processing, and then stored in a static hashtable. In this example, it would be also possible to retrieve that information in the custom Struts or JSF tag.

Particularly in FIG. 4c, the UTF-8 Unicode string length is counted (42) by using the JavaScript charCodeAt( ) method, which returns a number indicating the Unicode value of the character at the given index. If a character's Unicode value is equal to zero, the total length variable is incremented by 2 to represent 2 bytes of additional length (44). Likewise, if a character's Unicode value is less than 128, only 1 byte of length is added to the total length variable (45). If the character's Unicode value is less than 4096, then two bytes are added to the byte length total (46). Otherwise, three bytes are added to the byte length total (47). This is repeated (43) until all characters in the string have been considered, such that the total length in bytes is accumulated and reported to the calling application program. Preferably, a check is also made to make sure that the string is a non-null or non-empty entry, an error is returned if so.

In this manner, the invention considers each character using native functions of the programming language in which the invention is embodied to determine the codepoint of each character. Then, according to the encoding schema of the string such as UTF-8, ASCII, GB5, etc., the number of bytes associated with that codepoint are added to an accumulated total string length, until all characters have been considered, and a total string length in binary units (e.g. bits, bytes, words, etc.), has been determined. For certain encoding schemes, such as UTF-8, the storage lengths of codepoints may be associated with ranges or segments of codepoint values, which greatly simplifies processing because it can be done not on a specific character lookup basis, but rather on a ranged basis.

For embodiments of the invention intended to assist in offline database input processing, one available implementation option is to serialize and send the static hashtable as part of the offline application.

The following, more detailed description of the invention is provided using several particular example implementations.

It will be recognized by those skilled in the art that the features, descriptions, high level implementation provided in the following paragraphs can be implemented in a variety of programming languages using a variety of programming methodologies.

Invocation Using Style Sheet

In this implementation, the invention is provided as a client side style sheet in extensible Markup Language ("XML"). In this form, the invention is independent from any particular front-end application programs, and it also has accessibility and validity advantages.

Figure 1:
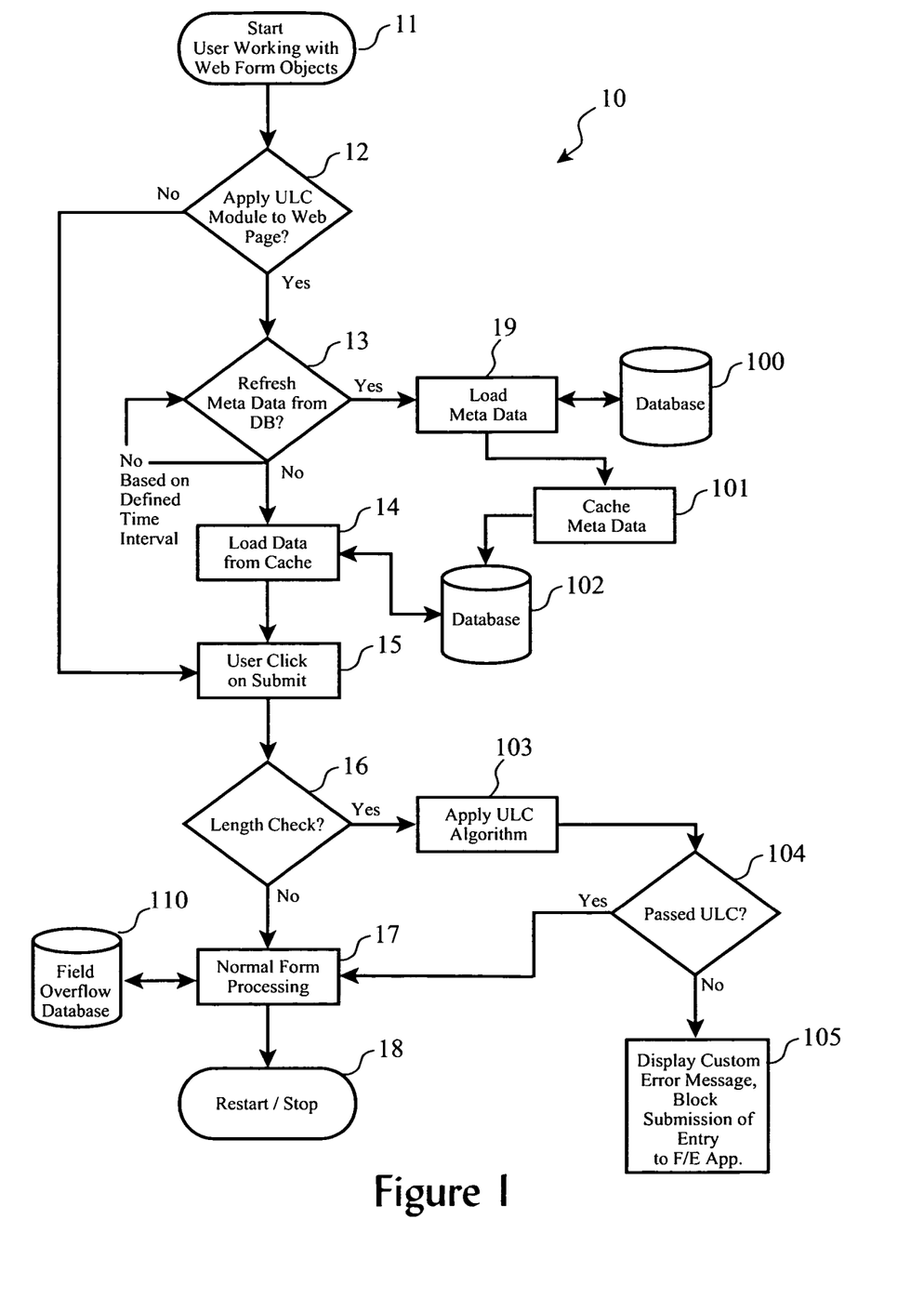
FIG. 1 shows a logical process according to one embodiment of the present invention.

Turning to FIG. 1, a style sheet is initially written (12), then programmers can use it without further modification. The field length metadata can be obtained (13, 19) by either directly querying live databases (100), or querying against a cached catalog (101, 102). After the data from cache is optionally loaded (14), and the user click's on "submit", "save", "send", or similar action triggers (15), the ULC plug-in optionally (16) checks (103) the length of each input according to the process of the invention.

If the length is found to be acceptable to the targeted database (104), it is passed on for normal handling and input to the database (17). Otherwise, a custom error message may be provided (105) to the user, as opposed to the cryptic error messages provided by databases upon such an error. The process (10) may be repeated (18, 11) as needed for additional input strings.

In this manner, the input strings which do not conform to the database input limits are blocked from being submitted to the database, cryptic error messages and security leaks are avoided, and intelligible, user-friendly error messages are provided in their stead.

Strut-based Embodiment

In this implementation, a Strut is employed to automate the process of putting the hidden fields in web pages. From a programming perspective, this can be done automatically. In operation, the front-end application program passes the sizes of database fields to hidden fields in the web pages, then as users are entering the characters in the web pages, the front-end application program calculates the number of bytes for UTF-8 strings until the strings reach the maximum allowable fields for the database.

Client-side Cached Catalog Embodiment

Figure 5C:
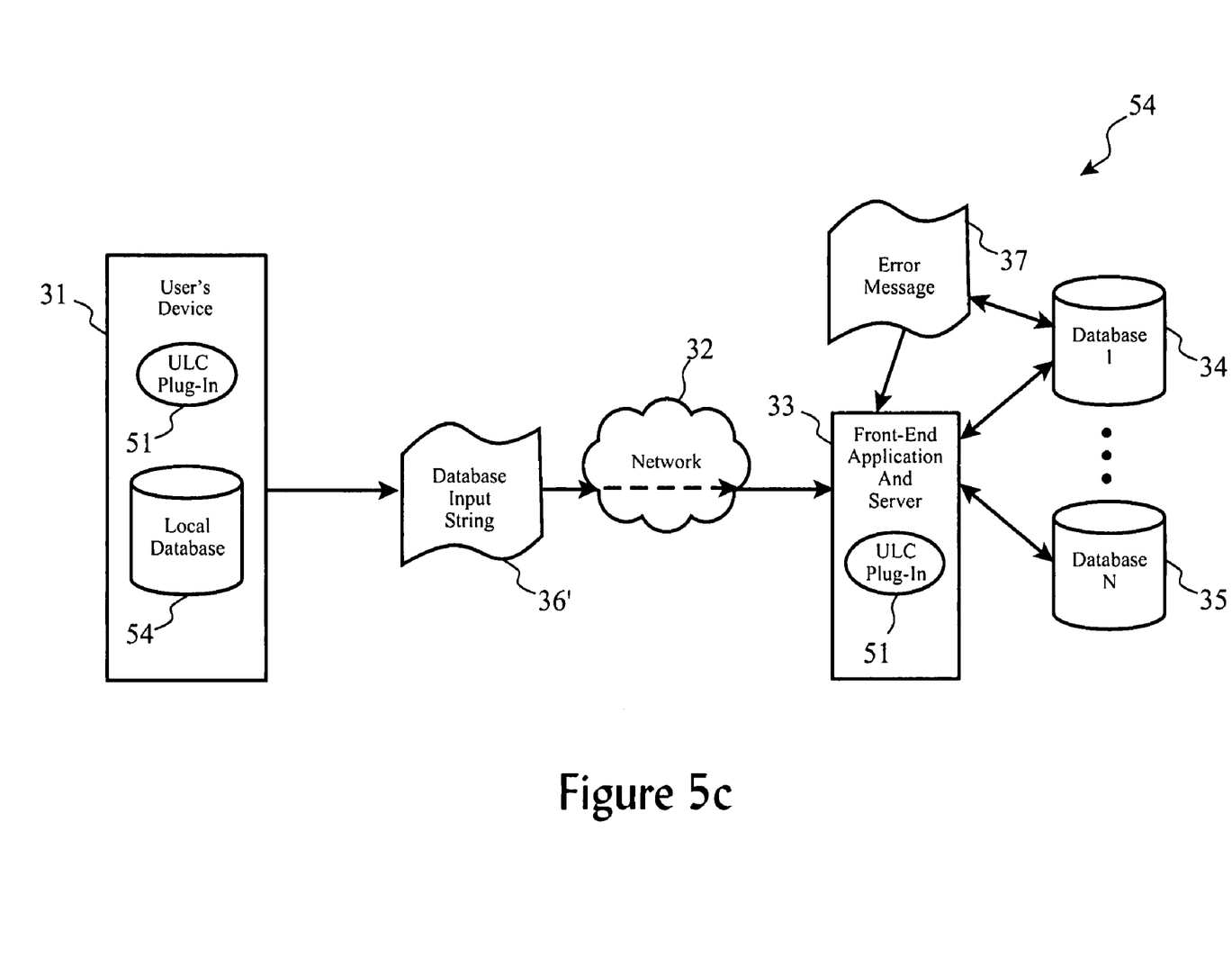

In this implementation of the invention (51), a database catalog (54) is stored as a cache on the client side (31), which is used to perform length checking at the client, such that only checked or qualified input strings (36') are sent to the front-end application programs (33), as shown in FIG. 5c. This embodiment works very well with off-line application programs, and has performance advantages over real-time, networked database catalog access, as there is a growing need to use off-line applications to store data on the client, and synchronize to the database server later on. According to this aspect of the invention, the ULC plug-in length checking logic does not depend on connectivity to a remote database via a network.

The database catalog cache is preferably encrypted to provide security in circumstances where is it not desired for users be aware of or have access to database tables and column field names. In this arrangement, mapping of real database field names and alias of the cache is performed by the application program running on the server, not on the client computer, such that users only know the maximum length and the parameter names for input fields.

The database catalog cache is preferably either stored as XML or in IBM's Cloudscape™, a well-known type of embedded database. In the latter case, few users would be aware of an embedded database existing on the client side, but it offers many features which came with matured relational database technology, such as storage persistence and SQL access.

Error Response, Tracking, and Resolution

When a user-entered text string exceeds the maximum allowed field length for a database, the ULC plug-in preferably logs the event so that application administrators or designers can direct feedback and audit history to know how many users have similar problems. This information can guide the administrators or designers to make an informed decision whether to increase database length.

There are several options to implementing logging of field length options, including but not limited to the following:

(a) As soon as a user exceeds the text string, the application issues a pop-up message to warn the user and stops further typing in the field. The benefit is that the user will not waste his/her effort on typing something that will not be accepted.

(b) The invention allows the user to continue typing the text after reaching the allowable length, but the application issues a warning and indicates where it exceeds the limit only AFTER the user submits the page. In this embodiment, the application only stores the string within the length limit, preferably. The benefit here is that the inventor or application can log how much the strings are exceeded, and can provide accurate feedback to the administrators.

(c) The database fields are created with very long length, but the application determines the maximum text entry according to its own rules upon submission of an entry. To avoid high amount of input and output when databases need to fetch these long rows, it is preferably to design these long fields in variable length since they only use bytes that are needed. The benefit of this approach is that one can change text entry field length in the application without having to change the database structure every time.

(d) The application stores the extra characters in the overflow fields based on certain criteria that are defined by the administrators, such as users' roles, organizations and service level agreements. This approach fits nicely with on-demand services. Besides being applicable to data entry fields, this embodiment can be applicable to content management systems, providing adjustable differential, maximum length and overflow attributes. For example, in a weblog ("blog") related application, benefit is taken from the customizable length as it is simply not practical to allow every blog entry to exceed an unlimited length, e.g. over 32 KB. Using the present invention, the system administrators can allow certain important topics or certain groups to extend 32 KB.

Overflow Character Processing

With particular focus on the embodiment described in the previous paragraph, the invention preferably captures overflow characters (e.g. characters which extend beyond the allowed input string length), records those characters, and then provides for configurable processing of those captured overflow "sub-strings". These logs of overflow information can be stored in a typical operational database, data mart, or data warehouse (110), so that other users or application programs can access them and perform analysis of them as desired.

For example, if a particular database field called "customer_comment" in an online hotel reservation system is limited to 75 characters, the following input string from a user:

"Requesting non-smoking, poolside room, please"

would be acceptable having a length of 45 characters, and would be submitted to the remote database without blocking.

However, the user-input string for "customer_comment" of:

"Please make sure my room is not above the second floor, as I have a fear of hotel fires and not being able to escape."

would exceed the allowed 25 character length by 42 characters, wherein the overflow sub-string captured by the invention would be:

"f hotel fires and not being able to escape."

According to one aspect of this embodiment of the invention, each individually captured overflow sub-string is processed by the invention, such as storing the sub-string in a second field called "comment_overflow_1". In this manner, an on-demand computing system can dynamically allocate memory or storage space if an overflow occurs.

According to another aspect of this embodiment of the invention, processing or analysis of many captured overflow sub-strings is performed to yield statistical and other information useful for management of the system, upgrading of the system, and especially on-demand allocation of the resources. For example, after a system such as the previously described hotel reservation system is run for a period of time, such as once per day or once per month, the character lengths of the captured overflow sub-strings can be analyzed to determine the average overflow length, which can then be used to determine a system upgrade plan, such as an on-demand resource allocation increase. If, for example, 15,000 reservations are used, the processing may determine that 95% of the reservations did not use or exceed the "customer_comment" field length, and that the 5% of reservations that did use exceed this field length, 80% of them exceeded the field length by 40 characters or less. So, a system administrator, or an on-demand resource allocation function, could allocate additional database storage to accommodate a maximum field length of 105 characters in order to handle 99% of reservations (e.g. 95%+(5% ·80%)).

Both aspects, individual and group overflow analysis, can be performed within the same embodiment, of course, if needed, as well as other types of analysis can be performed beyond the examples provided herein.

According to another aspect of the present invention, the schema applied to capturing and processing overflow string input information is based upon the user's role in an organization (e.g. manager, editor, administrator, etc.), a user's service level agreement (e.g. a contract between a computing services supplier and a computing services consumer which may stipulate resource consumption limits, costs, etc.), and the like. For example, if the overflow handling schema is based upon the user's role, the foregoing example overflow information may be stored in the additional "comment_overflow_1" field only if the inputting user is a manager or system administrator. In another example, the overflow information may be stored in the overflow field only if the service level agreement for the user's organization permits charging of the organization for the additional storage space.

Suitable Computing Platform

The invention is preferably realized as a feature or addition to the software already found present on well-known computing platforms such as personal computers, web servers, and web browsers. These common computing platforms can include personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 2A:
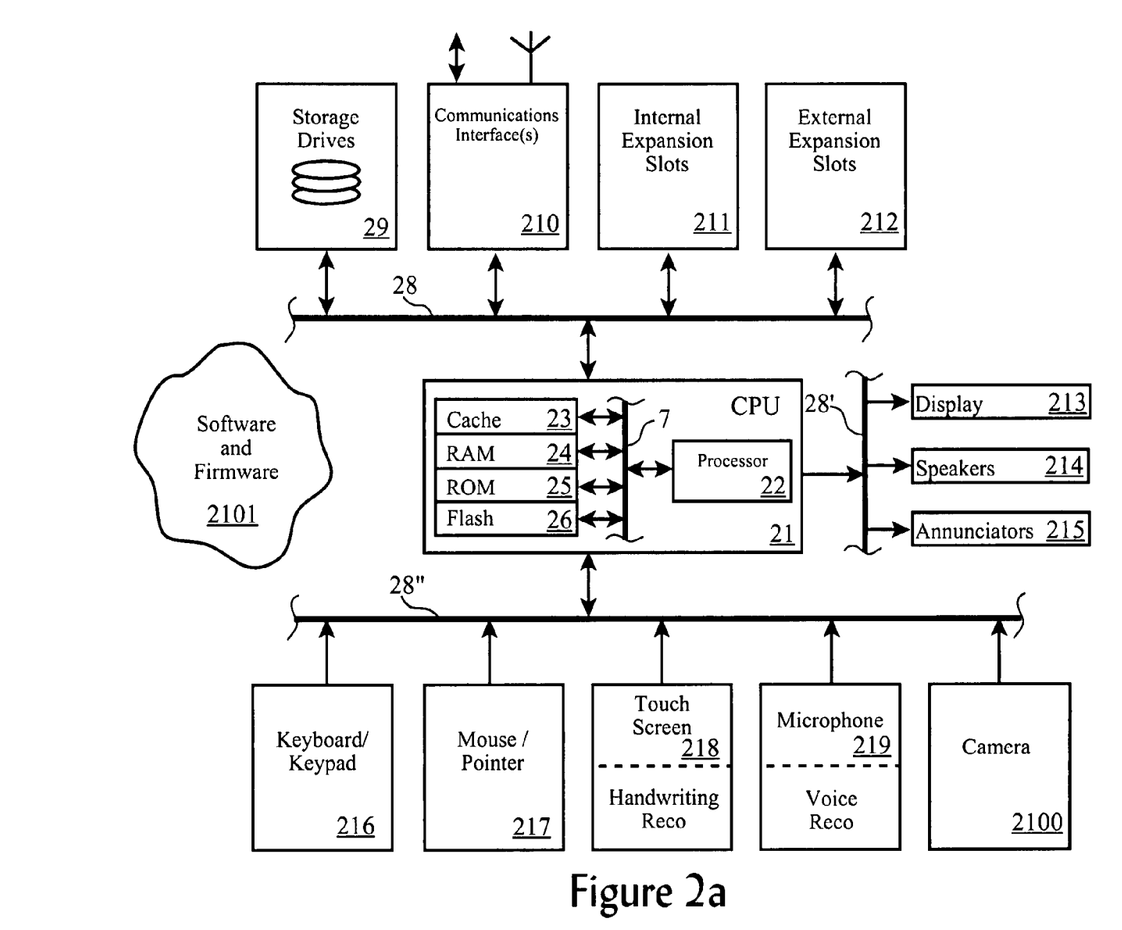
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as a hard-disk drives ("HDD"), floppy disk drives, compact disc drives (CD, CD-R, CD-RW, DVD, DVD-R, etc.), and proprietary disk and tape drives (e.g., Iomega Zip ™ and Jaz ™, Addonics SuperDisk ™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
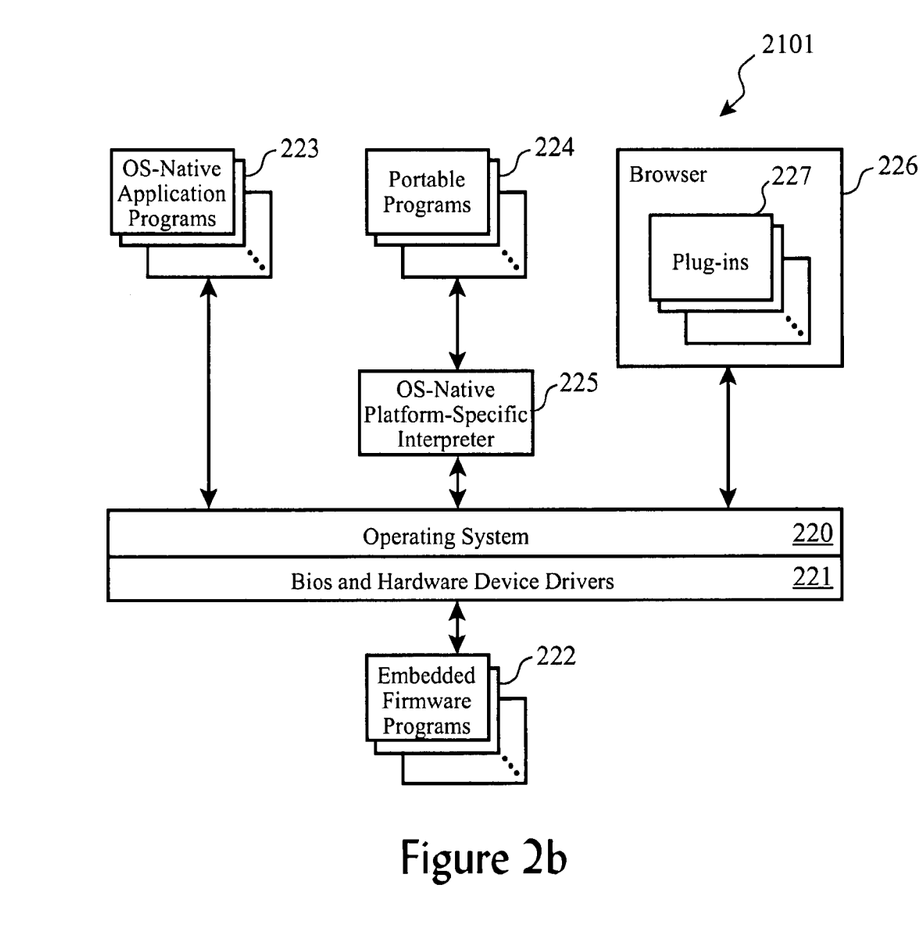

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS ™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

CONCLUSION

The present invention has been described, including several illustrative examples. It will be recognized by those skilled in the art that these examples do not represent the full scope of the invention, and that certain alternate embodiment choices can be made, including but not limited to use of alternate programming languages or methodologies, use of alternate computing platforms, and employ of alternate communications protocols and networks. Therefore, the scope of the invention should be determined by the following claims.

What is claimed is:

1. A computer implemented method providing:
   a computing platform with a processor and memory electronically receiving by a user's networked device a user-provided string of characters intended for input into a field in a remote computer database by:
   providing a hidden field associated with a visible user input field in a web page;
   receiving by said hidden field a field storage limit from a database front-end application;
   receiving by said front-end database application via said hidden and visible fields a user-provided string of characters intended for input into a database, said string being encoded according to a Unicode schema;
   accumulating a total string storage length by:
   for each character in said string, determining a character storage value by:
   (a) assigning a storage value of 2 to any character having a Unicode value of zero;
   (b) assigning a storage value of 1 to any character having a Unicode value between 1 and 127, inclusive;
   (c) assigning a storage value of 2 to any character having a Unicode value between 128 and 4095, inclusive; and
   (d) assigning a storage value of 3 to any character having a Unicode value of 4096 or greater; and accumulating said assigned character storage values to yield a total string storage requirement;
   comparing said total string storage length to said field storage limit received by said hidden field
   responsive to said total string storage length exceeding said string input storage limit, extracting a portion of said string of characters which extends beyond said string input storage limit,
   storing said extracted portion as an overflow sub-string of characters;
   performing at least one predetermined automatic processing action on said overflow sub-string to yield an action result, including capturing said user-provided string of characters in a administrator log; and
   subsequent to capturing a plurality of strings of characters in said log, adjusting said field storage limit value and an associated database field definition to reduce instances of user input exceeding database field size.

2. The method as set forth in claim 1 wherein said automatic processing action comprises storing said overflow sub-string in an overflow field of said database.

3. The method as set forth in claim 1 wherein said automatic processing action comprises performing a statistical analysis upon one or more overflow sub-strings, and, responsive to such statistical analysis, performing a system resource allocation to accommodate increased storage to handle without overflow said input strings.

4. The method as set forth in claim 3 wherein said step of performing a system resource allocation is performed by an on-demand computing system.

5. The method as set forth in claim 1 wherein said predetermined automatic processing action is selected by evaluation of a service level agreement.

6. The method as set forth in claim 1 wherein said predetermined automatic processing action is selected by evaluation of a user's organization role.

7. The method as set forth in claim 1 wherein said steps of determining, accumulating, comparing, extracting and storing are performed by a plug-in program product disposed in said front-end application server.

8. The method as set forth in claim 1 wherein said steps of determining, accumulating, comparing, extracting and storing are performed by a web services system accessible via a network by said front-end application server.

9. The method as set forth in claim 1 wherein said steps of determining, accumulating, comparing, extracting and storing are performed by a plug-in program product disposed in said user's networked device.

10. The method as set forth in claim 1 wherein providing a hidden field is performed by a member of a group of a strut and a Java Server Face.

11. The method as set forth in claim 1 further comprising:
    storing a database catalog as a cache on a database client device;
    performing said steps of accumulating and comparing by said client device such that only checked and qualified input strings are submitted to a front-end application program.

12. The method as set forth in claim 11 wherein said accumulating and comparing are performed during periods of disconnection between said client device and said front-end application program, and wherein said submission and blocking are performing during periods of connection between said client device and said front-end application program.

* * * * *

UNITED STATES PATENT AND TRADEMARK OFFICE
CERTIFICATE OF CORRECTION

| | | |
|---|---|---|
| PATENT NO. | : 7,603,365 B2 | Page 1 of 1 |
| APPLICATION NO. | : 11/337849 | |
| DATED | : October 13, 2009 | |
| INVENTOR(S) | : Yen-Fu Chen et al. | |

It is certified that error appears in the above-identified patent and that said Letters Patent is hereby corrected as shown below:

Cover Page:

(45) Please add an asterisk (*) before Oct. 13, 2009

(*) Please add: "This patent is subject to terminal disclaimer."

Signed and Sealed this

Thirty-first Day of January, 2012

David J. Kappos
*Director of the United States Patent and Trademark Office*